Patented Nov. 26, 1940

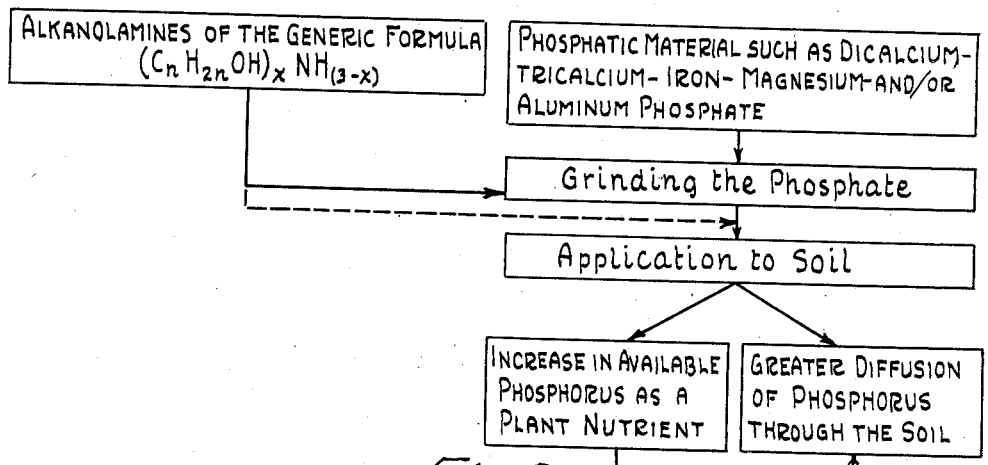
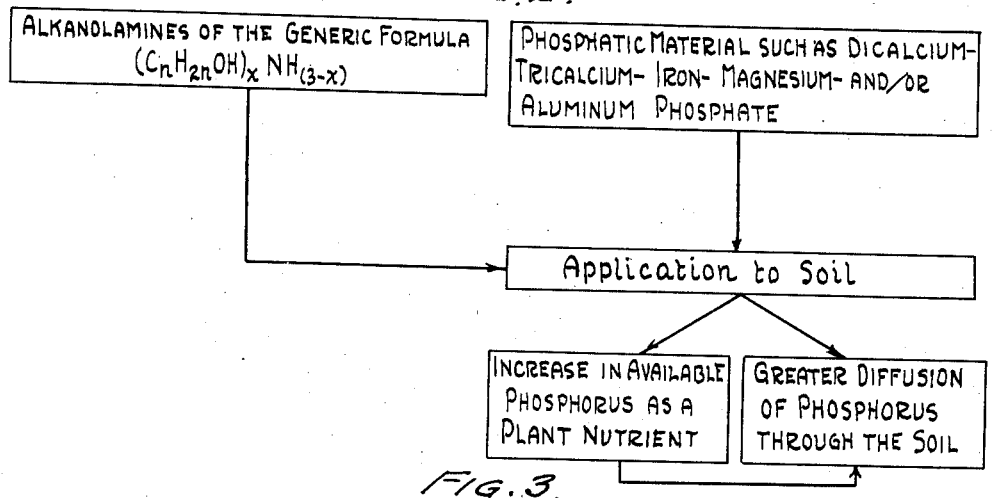
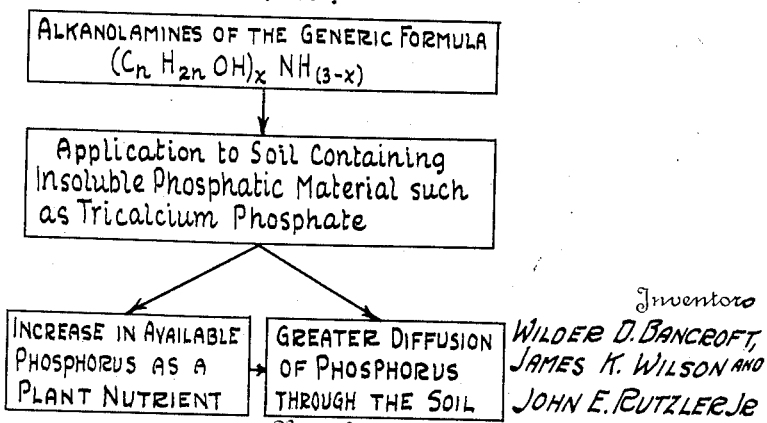

2,222,735

UNITED STATES PATENT OFFICE 2,222,735

PHOSPHATE FERTILIZER

Wilder D. Bancroft, James K. Wilson, and John E. Rutzler, Jr., Ithaca, N. Y.

Application October 18, 1938, Serial No. 235,668

9 Claims. (Cl. 71—27)

Our invention relates to methods of making insoluble phosphatic materials available for plant growth and to new fertilizer products which accomplish this. This application is a continuation-in-part of application Serial No. 113,254, filed November 28, 1936.

Phosphatic materials, such as ordinary tricalcium phosphate, contain phosphorus which is a valuable plant nutrient; but under ordinary conditions the phosphorus in tricalcium phosphate is not highly available to plants. This lack of availability of the phosphorus in ordinary phosphate rock, tricalcium phosphate, Thomas slag, guano and other phosphatic materials which contain appreciable percentages of phosphorus in only a slightly available form, has made necessary the acid treatment whereby rock phosphate is converted by a strong acid, such as sulfuric acid, to forms which are much more available to plants. Such processes broadly speaking produce either the water-soluble form, such as monocalcium phosphate, or the slightly water-soluble form di-calcium phosphate, which is somewhat available to plants and is ordinarily designated as citrate soluble.

It is an object of our invention to make available the phosphorus in tricalcium phosphate or other insoluble phosphatic materials such as phosphate rock, guano, Thomas slag, calcium metaphosphate, ferric, aluminum, calcium and magnesium phosphates and the like, without treating these materials by expensive processes and without subjecting them to chemical decomposition.

Further objects of our invention are to provide a fertilizer the phosphorus in which becomes available to plants after application to the soil and which will retain its availability for a considerable length of time. The phosphorus in our fertilizer materials will be found in an available form over a considerable range of depth in the soil compared, for example, to the phosphorus in phosphate rock alone.

With these and other objects in view, which will be readily apparent from the ensuing description, our invention comprises the steps hereinafter set forth and the products resulting from the steps enumerated.

We have found that when certain amines are applied to soil which contains residual, unavailable compounds of phosphorus large increases in plant growth result. For example, when diethanolamine is applied either to a Dunkirk soil which has been phosphated in past years or to a Dunkirk soil in conjunction with a phosphatic material such as phosphate rock in which the phosphorus is of a low degree of availability, commercially important increases in yields of tomatoes, rutabagas and soy beans are obtained. Without the presence of the amine under such circumstances the yields were found to be considerably less. Other amines, such as triethanolamine and monoethanolamine for example, also give excellent increases in yields of fruits and grains when applied to soils containing unavailable phosphorus or when applied to the soil in conjunction with substantially insoluble phosphatic materials. So far as we have been able to determine, there is no direct chemical reaction between our amines and the insoluble phosphatic materials which we prefer to use therewith. Our invention is useful in many and diverse types of soils as is shown by the fact that large increases in yields have been obtained when amines were applied to as widely different types of soils as Dunkirk, Ontario, Sassafras, Minatare and Volusia soils, for example. A variety of plants have been found to give large increases in yields when one of our amines is applied to such soils in presence of substantially insoluble, unavailable phosphatic materials; by way of examples we may cite the following: tomatoes, rutabagas, white mustard, buckwheat, barley, soy beans, millet, peas, pasture grasses, beets, oats, and wheat. It will be seen from this enumeration that leguminous as well as non-leguminous plants and fruits, grains, root crops and grasses all have been found to respond to the practice of our invention.

A new, novel and unexpected result of the application of our amines to the soil, along with insoluble phosphatic materials, or to soil containing unavailable phosphorus, is that it causes the phosphorus in said phosphatic materials to become available to plants. Ordinarily it would be expected that addition of amines to the soil would result in increased plant growth which could be accounted for wholly on the basis of the nitrogen added in the form of the amine. Quite unexpectedly, we have found that this is not the case. When a fertilizer such as urea is applied to the soil the increase in plant growth which results is due largely to the nitrogen which is thereby supplied to the growing plants. Amines such as we prefer to employ in the practice of our invention function in part to supply nitrogen to the growing plant. We have found, however, that a much more important effect of these compounds is their action in and on the soil whereby unavailable phosphorus is released for use by the growing plant in amounts far in excess, as judged by the amount of increased growth obtained, of the amount of phosphorus that becomes available when the common nitrogen fertilizers such as calcium cyanamide, ammonium sulphate, dried proteins, sodium nitrate or urea, for example, are applied to the soil. Amines such as we employ surprisingly do not act as good nitrogen fertilizers compared to the ordinary nitrogenous fertilizers on the basis of equal amounts of nitrogen, except when there are large amounts of available phosphorus in the soil prior to the application of the amine.

In order for our amines to function well to increase the growth of plants by virtue of an action in the soil whereby the availability of unavailable phosphatic compounds and complexes is increased, we find that it often is advantageous to add phosphatic materials to the soil concurrently with the amines. This is particularly the case in soils having very small supplies of insoluble, unavailable phosphates and in soils which have never been phosphated. On the other hand, when a given soil contains from moderate to large amounts of residual, non-available phosphorus, we may prefer to apply our amines directly and without the addition of more phosphorus.

In the course of reducing our invention to practice, we have found that the particular form in which the substantially insoluble unavailable phosphatic material occurs is not of controlling importance. Thus, the amines that we prefer to use have the unsuspected property of increasing the availability of the phosphorus in a wide range of such phosphatic materials as, for example, tricalcium phosphate, rock phosphate, Thomas slag, guano, ferric phosphate, aluminum phosphate, magnesium phosphate, reverted superphosphate and other similar materials. Monoethanolamine, diethanolamine and triethanolamine, the corresponding propanolamines, isopropanolamines and butanolamines and various mixtures thereof increase the availability of the unavailable phosphorus in substantially insoluble phosphatic materials either when applied to the soil alone or when applied to the soil in admixture with said substantially insoluble phosphatic materials.

When our fertilizer compositions are applied to the soil, or are made in the soil as the case may be, a portion of the unavailable phosphorus in the phosphatic materials becomes solubilized so that it is more available for plant growth. While the exact mechanism of this action is not clear to us, it appears to be a fact that a part of the solubilized phosphorus diffuses in the soil solution so that available phosphorus is to be found over a greater portion of the soil profile than would be the case in the absence of the amine.

That the increased availability of phosphorous brought about by our amines is not a transitory effect is shown by the fact that upon growing a second crop, a year later, on land treated as in the examples of the practice of our invention which are given, excellent increases in plant growth are obtained. Thus one treatment results in two years' increase in plant growth of a degree that cannot be explained on the basis of either the amount of phosphorus or the amount of nitrogen added in carrying out the invention.

We have found that amines having the generic formula $(C_nH_{2n}OH)_xNH_{(3-x)}$, which might be called alkanolamines, and mixtures thereof, have this new, novel and useful property of increasing the availability of the phosphorus in substantially insoluble phosphatic materials. It is these alkanolamines that we prefer to use in the practice of our invention. These amines all have another characteristic property which, for some reason which is not clearly understood, marks them as useful in the practice of our invention and distinguishes them from other amines and similar compounds which do not markedly increase the availability of the phosphorus in insoluble phosphatic materials. We have found that all of these alkanolamines which increase the availability of phosphorus to growing plants possess the property of peptizing tricalcium phosphate, or finely ground phosphate rock, in aqueous dispersion media in which there are substantially no coagulating cations such as calcium, magnesium and iron, for example, or in aqueous dispersion media in which the concentration of monovalent cations is low. This property distinguishes our amines from compounds such as, for example, aniline, pyridine and urea which do not appreciably peptize tricalcium phosphate, or finely ground phosphate rock, in aqueous dispersion media and also do not act in the soil to markedly increase the availability to growing plants of the phosphorus present in the soil in substantially unavailable forms.

Examples of procedures which will accomplish the desired result of making the phosphorus in substantially insoluble phosphates, or phosphatic materials, available for plant growth will now be given. These examples are by way of illustration only, it being clearly understood that there are many equivalent methods which will be obvious to those skilled in the art once the details of the practice of our invention are disclosed.

*Example I*

This is an example of compositions comprising an insoluble phosphatic material and one or more alkanolamines having the generic formula $(C_nH_{2n}OH)_xNH_{(3-x)}$ which when applied to the soil furnish available phosphorus to the growing plant either more efficiently or in larger amounts than if the insoluble phosphatic material were applied alone. As a suitable amine we may employ, for example, monoethanol-, monopropanol-, or monobutanolamine, diethanol-, dipropanol-, or dibutanolamine, triethanol-, tripropanol-, or tributanolamine, or any other alkanolamines such as, for example, the isopropanol and isobutanol amines, or mixtures of these. As insoluble phosphatic material we may employ, for example, tricalcium phosphate, dicalcium phosphate, iron phosphate, magnesium phosphate or aluminum phosphate. Or we may employ a mixture of these phosphates in a fairly pure form or in the form of phosphate rock of a high or inferior grade as judged by the standards of the day. Thomas slag, guano and other phosphatic materials, such as insoluble metaphosphates, may be used. The choice of insoluble phosphatic material to be used in our compositions may be varied over a very wide range, as will be apparent to those skilled in the art. While on the other hand it is of very great importance to employ the proper kind of amine.

It is only necessary to grind the phosphatic material to a fairly fine state of subdivision, so that it will pass through a 200-mesh sieve for instance. Clearly, many of the ordinary industrial grinding methods will serve for this purpose. The more finely divided the material is, the more efficiently will it serve to supply available phosphorus to plants and the more effective will the amine be in increasing the availability of the phosphorus therein when the composition is incorporated with the soil. From our experiments, there does not appear to be any critical particle size of the insoluble phosphatic material above which or below which the amine fails entirely to function to produce a composition which when applied to the land will supply a greater than normal amount of available phosphorus for growing plants. On the other hand, the size of the particles of the insoluble phosphatic material influences the amount of amine that can be incorporated therewith to produce a composition having acceptable mechanical properties for easy, uniform distribution over the land. The smaller the size of the particles the greater, within limits, is the amount of amine that can be incorporated with a given amount of a specific phosphatic material.

The amine may be incorporated with the insoluble phosphatic material in any one of several ways. For instance, the desired amount of the amine may be intimately mixed with the phosphatic material during the latter part of the dry grinding operation upon said phosphatic material provided means are employed to prevent volatilization and/or decomposition of the amine by the heat generated during said grinding. Or, the grinding may be carried out in water cooled apparatus to prevent volatilization and/or decomposition. If wet grinding is employed, the liquid used may be a water solution of the amine.

Alternatively, the phosphatic material may be mixed after being ground and while in a dry condition with the desired quantity of the desired alkanolamine. There are numerous well-known methods for accomplishing this.

Again, we may prefer to mix finely ground phosphatic material with a solution of the amine. This may be done in several ways which are familiar to those skilled in the art, using as solvent for the amine either water or organic liquids. Furthermore, the amine may be incorporated with the phosphatic material at any one of several times. For instance, they may be mixed either during or immediately after grinding, or when bagging the phosphatic material for sale, or by atomizing the amine or a solution thereof into the phosphatic material at some stage of its handling on the farm.

A number of compositions which when applied to the land will accomplish the desired result of making the phosphorus in substantially insoluble phosphatic materials more available to plants than it would be in absence of the amine will now be given. It is to be understood that these compositions are merely by way of example and that other, equivalent compositions will accomplish the desired results as well as combinations of the compositions given.

1
| | Pounds |
|---|---|
| Phosphate rock | 1000 |
| Diethanolamine | 90 |

2
| | |
|---|---|
| Phosphate rock | 1000 |
| Triisopropanolamine | 100 |

3
| | |
|---|---|
| Phosphate rock | 1000 |
| Diethanolamine | 60 |

4
| | |
|---|---|
| Phosphate rock | 1000 |
| Limestone | 1000 |
| Diethanolamine | 175 |

5
| | |
|---|---|
| Phosphate rock | 1000 |
| Diethanolamine | 35 |
| Triethanolamine | 30 |
| Monoethanolamine | 25 |

6
| | |
|---|---|
| Phosphate rock | 1000 |
| Limestone | 1000 |
| Diethanolamine | 75 |
| Monoethanolamine | 75 |
| Triethanolamine | 30 |

7
| | |
|---|---|
| Phosphate rock | 1000 |
| Diethanolamine | 60 |
| Tripropanolamine | 15 |
| Tributanolamine | 15 |

8
| | |
|---|---|
| Phosphate rock | 1000 |
| Potassium chloride | 200 |
| Sodium nitrate | 400 |
| Diethanolamine | 35 |
| Triethanolamine | 35 |
| Monoethanolamine | 30 |

9
| | |
|---|---|
| Thomas slag | 2000 |
| Triethanolamine | 130 |
| Triisopropanolamine | 50 |

10
| | |
|---|---|
| Guano | 2000 |
| Triethanolamine | 175 |

11
| | |
|---|---|
| Ferric phosphate | 1000 |
| Monoethanolamine | 60 |
| Triisopropanolamine | 20 |

12
| | |
|---|---|
| Tricalcium phosphate | 1000 |
| Diethanolamine | 80 |

In general, the compositions given are sufficient in amount to treat approximately two acres of land. However, this will vary widely depending upon the fertilizer requirements of the land to which these compositions are applied.

The compositions given by way of example of the practice of our invention illustrate a few of the variations which are to be construed as covered by said invention. For instance, compositions 1, 2, 5, and 7 illustrate the use of different amines; while compositions 5, 6, 7, 8, 9, and 11 illustrate the use of mixtures of amines. Various proportions of amine to insoluble phosphatic material are shown in compositions 1, 2, 3, 4, 6, and 12; while mixture number 6 shows how other fertilizer material can be incorporated with the insoluble phosphatic material and the amine so that the amount of the amine compared to the amount of phosphatic material can be increased without producing a too sticky and lumpy composition for efficient, easy distribution over the land. Composition 8 illustrates the use of an amine and an insoluble phosphatic material in a complete fertilizer mixture. Compositions 1, 9, 10, 11, and 12 illustrate the use of a variety of phosphatic materials in our fertilizer mixtures.

The proportion of amine to insoluble phosphatic material can be varied over a wide range, although for the most effective practice of our invention we have found that the proportion should be so adjusted that when the composition is applied to the land from 10 to 190 pounds of the amine will be applied to each acre thereof. However, it should be understood that greater and lesser amounts of amine than these also will function to give larger increases in plant growth than would be obtained from the phosphatic material alone or the phosphatic material plus an amount of nitrogen equivalent to that present in the amine. Therefore, our invention is not limited to any specific range of amounts of amines.

*Example II*

Instead of mixing an insoluble phosphatic material with an amine and applying the mixture to the soil, we may prefer to make the mixture in the soil, as shown diagrammatically in Figure 2. For this purpose a finely ground, 200 mesh, for example, phosphatic material either of high or low grade is applied to the soil at the rate of from 100 to 2000 pounds per acre. A suitable alkanolamine or a combination of suitable alkanolamines, such as will peptize tricalcium phosphate in aqueous solution in absence of too high a concentration of metallic, coagulating cations, is then applied to the soil. In applying the amine we find that it is preferable to make a water solution thereof of a concentration of less than fifty percent and apply said solution to the land in order to ensure a uniform distribution over the land. Either higher or lower concentrations of amine can be employed in the preparation of a mixture suitable for application to the soil; the pure amine may be placed on the soil if desired. However, when the amine is applied at a time when the crop is in the soil to be treated, much less concentrated solutions than fifty percent must be employed in order to avoid a toxic effect on the plants, or else special precautions should be taken to avoid contact between plant and amine. In general, solutions of a strength of less than ten percent of amine are employed by preference when there is a growing crop in the ground.

For the purpose of carrying out this form of our invention we prefer to employ not less than ten pounds of amine per acre of land and not as much as will be toxic to the plant which is to be grown on the soil. The order of application of the phosphatic material and the amine may be reversed if desired. Alternatively, we find it desirable to make a solution of a soluble fertilizer material such as potassium nitrate, by way of example, and add to such solution the proper amount of a suitable amine and apply the whole to the soil.

*Example III*

Since many soils contain natively an abundance of substantially insoluble and unavailable phosphatic materials, we prefer in many such cases to apply one or more of our alkanolamines or a mixture thereof to the soil in the manner and at the rate indicated in Example II, without first or subsequently applying any phosphatic material whatever. Also, many soils contain quite large supplies of substantially insoluble phosphatic materials resulting from the reversion and fixation of phosphorus fertilizers which have been applied thereto previously. Such soils as these benefit markedly from the application of our alkanolamines or mixtures thereof without further application of phosphorus.

On such soils as these we prefer to apply from ten to five hundred pounds per acre of our alkanolamines. By way of example, one hundred pounds per acre of diethanolamine gave approximately 90% increase in yield of tomatoes when applied to Ontario silty clay loam which had been heavily phosphated with superphosphate for about six years prior to the application of the amine; while twelve hundred pounds per acre of 4—12—4 fertilizer containing superphosphate gave a slightly smaller increase in yield.

We have found in soils such as these that it is only necessary to incorporate the amine with the soil in any of the ways indicated in Example II to achieve the results of increased phosphorus availability and increased plant growth. This example is shown diagrammatically in Figure 3. Alternatively to broadcasting the amine or an aqueous solution thereof over the land, we may prefer to apply the amine or its solution in rows beside the planted seeds or growing plants as the case may be. When this procedure is adopted, we have found that a smaller total quantity of our alkanolamines is required to produce the maximum amount of increased growth.

It will be seen readily by those skilled in the art that this example of the practice of our invention is merely a variant of Example I in that in the present example the mixture of phosphatic material and amine is formed in the soil rather than being preformed and then added to the soil as in Example I.

While we have described the preferred embodiment of our invention, we wish it to be understood that we do not confine ourselves to the precise details herein set forth by way of illustration, as it is apparent that many changes and variations may be made therein, by those skilled in the art, without departing from the spirit of the invention or exceeding the scope of the appended claims.

We claim:

1. A new fertilizer composition comprising a finely divided and substantially insoluble phosphatic material and an alkanolamine, the weight of said amine amounting to approximately 6 to 9 per cent of the weight of the phosphatic material present in the said composition.

2. A new fertilizer composition comprising a finely divided and substantially insoluble phosphatic material, calcium carbonate and an amine having a formula corresponding to the generic formula $(C_nH_{2n}OH)_xNH_{(3-x)}$ said phosphatic material and calcium carbonate being in substantially equal proportions by weight and said amine constituting approximately 9 per cent by weight of the phosphatic material.

3. A new fertilizer composition comprising a finely divided and substantially insoluble phosphatic material and an amine having a formula corresponding to the generic formula $$(C_nH_{2n}OH)_xNH_{(3-x)}$$

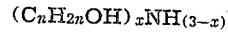

the weight of said amine amounting to approximately six to 9 per cent of the weight of the phosphatic material present in the said composition.

4. A new fertilizer composition comprising a finely divided and substantially insoluble phosphatic material and monoethanolamine, said amine being present in peptizing proportions.

5. A new fertilizer composition comprising a finely divided and substantially insoluble phosphatic material and diethanolamine, said amine being present in peptizing proportions.

6. A new fertilizer composition comprising a finely divided and substantially insoluble phosphatic material and triethanolamine, said amine being present in peptizing proportions.

7. A new fertilizer composition comprising a finely divided and substantially insoluble phosphatic material and monoethanolamine, the weight of said amine amounting to approximately 6 to 9 per cent of the weight of the phosphatic material present in the said composition.

8. A new fertilizer composition comprising a finely divided and substantially insoluble phosphatic material and diethanolamine, the weight of said amine amounting to approximately 9 per cent of the weight of the phosphatic material present in the said composition.

9. A new fertilizer composition comprising a finely divided and substantially insoluble phosphatic material and triethanolamine, the weight of said amine amounting to approximately 6 to 9 per cent of the weight of the phosphatic material present in the said composition.

WILDER D. BANCROFT.
JAMES K. WILSON.
JOHN E. RUTZLER, Jr.